(12) United States Patent
Olson et al.

(10) Patent No.: US 6,250,843 B1
(45) Date of Patent: Jun. 26, 2001

(54) TRIM ASSEMBLY FOR USE WITH A FLANGED SUPPORT POST

(75) Inventors: Jeffrey C. Olson, Dallas; Eric C. Johnson, Mountaintop; Bradley J. Carlson, Wilkes-Barre, all of PA (US)

(73) Assignee: Metro Industries, Inc., Reno, NV (US)

( * ) Notice: Subject to any disclaimer, the term of this patent is extended or adjusted under 35 U.S.C. 154(b) by 0 days.

(21) Appl. No.: 09/164,627

(22) Filed: Oct. 1, 1998

(51) Int. Cl.$^7$ .................................................. F16B 5/00
(52) U.S. Cl. ........................ 403/381; 403/170; 403/217; 312/245
(58) Field of Search ............................... 403/381, 363, 403/335, 170, 217, 230, 263; 312/111, 140, 265.1, 245; 108/64, 65, 42, 48

(56) References Cited

U.S. PATENT DOCUMENTS

| | | | |
|---|---|---|---|
| 3,751,127 | * 8/1973 | Black, Jr. et al. | 312/111 |
| 3,836,218 | * 9/1974 | Hallal | 312/111 |
| 4,329,003 | * 5/1982 | Manchester | 312/245 |
| 4,403,817 | * 9/1983 | Aidar | 312/265.1 |
| 4,455,103 | * 6/1984 | Hackenberg | 403/170 X |
| 4,544,300 | * 10/1985 | Lew et al. | 403/381 X |
| 4,652,170 | * 3/1987 | Lew | 403/217 X |
| 4,941,763 | * 7/1990 | Euteneuer | 403/381 X |
| 4,968,105 | * 11/1990 | Schaars | 312/140 |
| 5,039,177 | * 8/1991 | Newell et al. | 312/111 |
| 5,370,454 | * 12/1994 | Domenig | 403/363 X |
| 5,466,057 | * 11/1995 | Blankenburg | 312/111 X |
| 5,647,650 | 7/1997 | Daugherty et al. | 312/265.1 |
| 5,651,630 | * 7/1997 | Nomura | 403/170 X |
| 5,673,983 | 10/1997 | Carlson et al. | 312/218 |
| 5,715,760 | * 2/1998 | Frascaroli et al. | 312/111 X |
| 5,791,806 | * 8/1998 | Giehl | 403/381 |
| 5,960,599 | * 10/1999 | Schmidt et al. | 403/381 X |

* cited by examiner

*Primary Examiner*—Lynne H. Browne
*Assistant Examiner*—John R. Cottingham
(74) *Attorney, Agent, or Firm*—Fitzpatrick, Cella, Harper & Scinto

(57) ABSTRACT

A trim assembly for use with at least one flanged support post including a first trim member engagable with the flanged support post, and a second trim member engagable with the first trim member.

5 Claims, 8 Drawing Sheets

TRIM ASSEMBLY FOR USE WITH A FLANGED SUPPORT POST

BACKGROUND OF THE INVENTION

1. Field of the Invention

The present invention relates generally to a trim assembly for interfacing with a flanged support post. In particular, the invention relates to a trim assembly that removably attaches to flanged support posts of modular storage units.

The trim assembly includes trim members having longitudinally oriented flanges for slidably engaging a slot formed in the flanged support posts.

The trim assembly of the present invention is designed for use with flanged support posts of the type shown in U.S. Pat. No. 5,647,650, which is incorporated herein by reference. As shown in FIG. 8, a support post 20 is generally comprised of an interior post 73 and a plurality of radially extending flanges 75. The interior post is preferably tubular in shape, with a circular cross-section and interior 77 and exterior 79 wall surfaces. The flanges 75 preferably extend along the entire longitudinal length of the interior post. In addition, the flanges 75, or dove tails, are preferably spaced equidistant from each other around the periphery of the interior post 73 to create a symmetrical support post.

As best seen in FIG. 8, each flange has a first portion 21 which extends radially from the interior post 73. At the terminal end of each first portion is transversely disposed a second portion 23. The second portions are formed with arcuate outer surfaces 25, that together outline a circumference that is concentric with the interior 77 and exterior 79 wall surfaces of the interior post 73. Together, the first portion 21 and second portion 23 can be described as forming a T-shaped structure extending radially from the interior post 73. A slot 27 is formed between adjacent flanges 75. Because of the arcuate shape of the exterior wall surface 79 and the T-shaped flanges 75, the slots can be described as substantially concave, with the side portions thereof each forming opposing C-shaped wall surfaces defined by the inner sides of adjacent T-shaped flanges 75. The flanges 75 can also include horizontal grooves 29 on their outer surfaces 25, as shown in FIG. 7.

The flanged support posts 20 are part of a platform system used in constructing the modular units. In an open structure type of modular unit, the flanged support posts 20 can be used to form, for example, a shelving system. In an enclosed structure type modular unit, the flanged support posts 20 are used with an array of top, bottom and side panels to form, for example, a cart or cabinet.

2. Description of the Prior Art

Modular storage units in the form of enclosed or open structures are well known in the art.

In one type of enclosed storage unit disclosed in the '650 patent, flanged corner support posts 20, as described above, receive vertical edges of side panels into the slots 27 formed by the flanges 75 to form a storage assembly. In a storage assembly of this type, linear trim pieces extending the length of the flanged support posts 20 can be inserted into exposed slots 27 of the support posts 20 not receiving the side panels. These trim pieces have arcuate outer surfaces that, when inserted into the slots 27, form a substantially continuous outer face with the arcuate outer surfaces of the T-shaped flanges 75 of the support posts 20.

However, further improvements in modular storage units are desired. For example, it would be desirable to provide a trim assembly that enhances the use of such modular storage units.

SUMMARY OF THE INVENTION

It is a principal object of this invention to provide a trim assembly for interfacing with a flanged support post.

It is another object of the present invention to provide a trim assembly that removably attaches to a flanged support post.

Still another object of the present invention is to provide a trim assembly for interconnecting separate flanged support posts.

Yet another object of the present invention is to provide a trim assembly for spacing a flanged support post from a wall or other vertically oriented structure.

In accordance with one aspect of the invention, a trim assembly for use with at least one flanged support post comprises a first trim member engagable with the flanged support post, and a second trim member engagable with the first trim member.

In accordance with another aspect of the present invention, a trim assembly for use with flanged support posts of platform assemblies, wherein the flanges of the flanged support posts form vertically oriented slots, comprises a first trim member having a first flanged portion. The first flanged portion is engagable with one flanged support post and the trim assembly operates to connect flanged support posts from separate platform assemblies.

In accordance with still another aspect of the present invention, a trim assembly for use with flanged support posts of platform assemblies, wherein the flanges of the flanged support posts form vertically oriented slots, comprises a first trim member and a second trim member. The first trim member comprises a first flanged portion engagable with one flanged support post. The second trim member comprises a straight edge along its vertical length. The first trim member is engagable with the second trim member.

In accordance with yet another aspect of the present invention, a trim assembly for use with a flanged support post comprises a first trim member including a first flanged portion. The first trim member is engagable with the flanged support post and the trim assembly operates to interface the flanged support post with a wall.

DETAILED DESCRIPTION OF THE INVENTION

Figure 7:
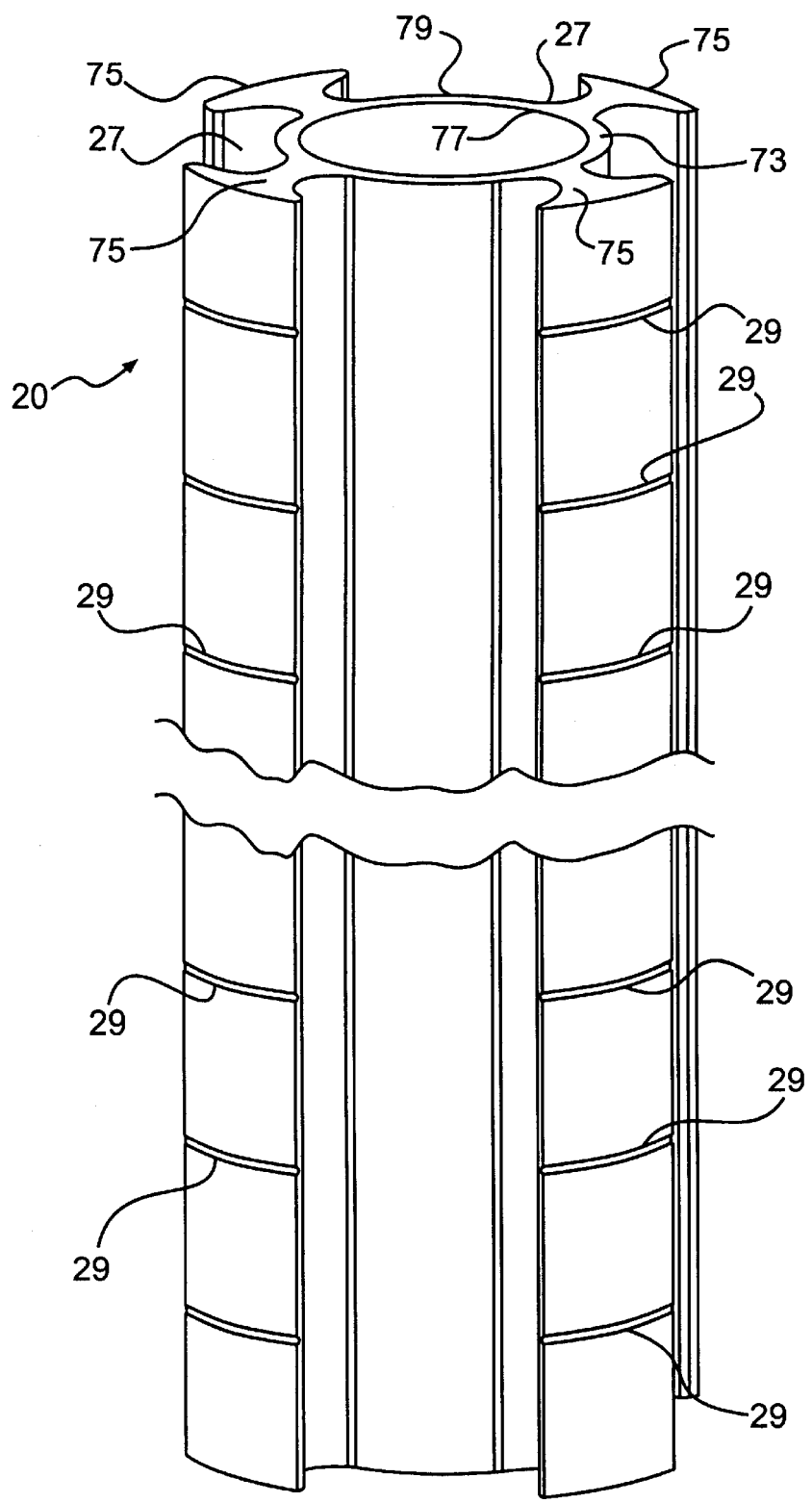
FIG. 7 is a perspective view of a flanged support post used along with the present invention.
Figure 8:
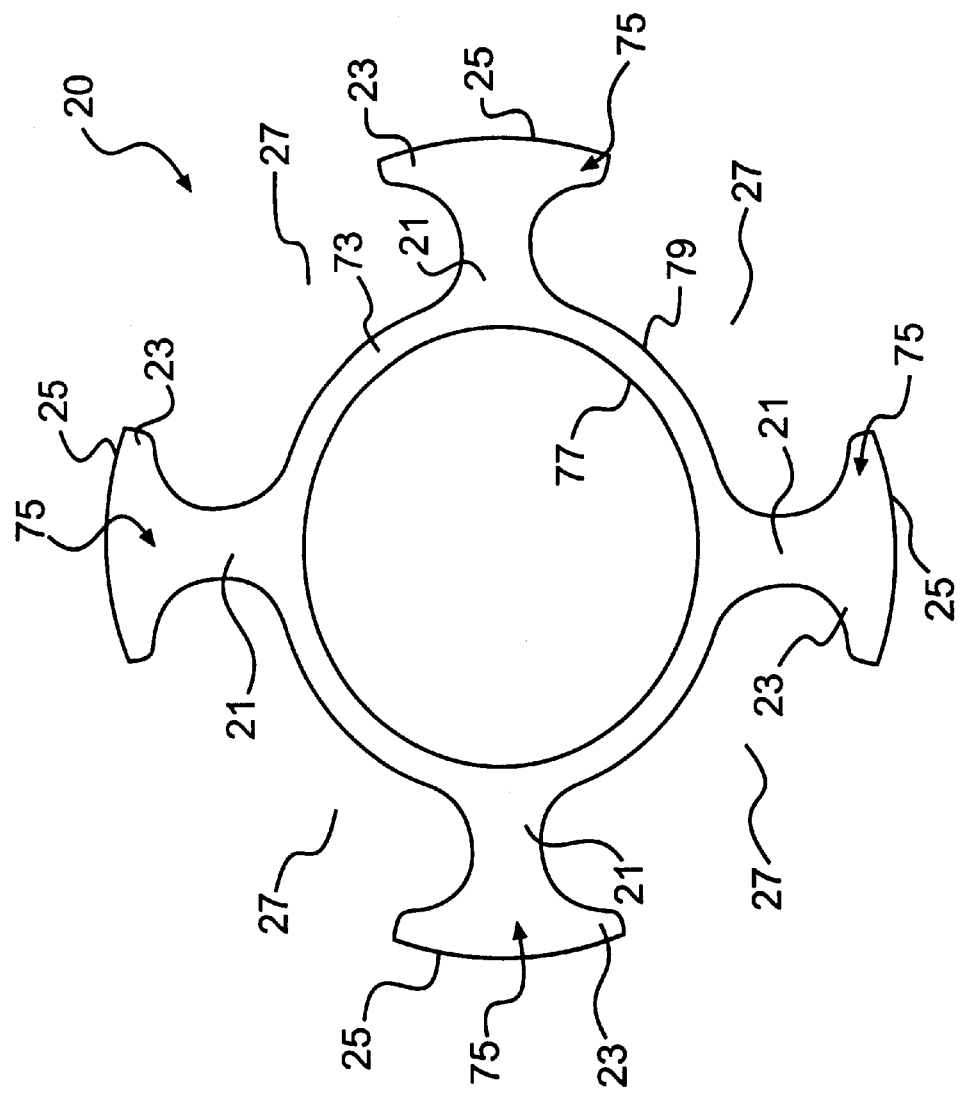
FIG. 8 is a top plan view of a flanged support post used along with the present invention.

The trim assembly of the present invention is ideally suited for use with flanged support posts 20, shown in FIGS. 7 and 8 and discussed above. These flanged support posts 20 typically form the corner supports of a platform system, such as that schematically shown in FIG. 1.

Of course, the flanged support posts 20 shown in FIGS. 7 and 8 are only one type of environment in which the trim assembly of the present invention can be used. The trim assembly can be varied in construction to operate with support posts of different sizes and shapes.

Figure 1:
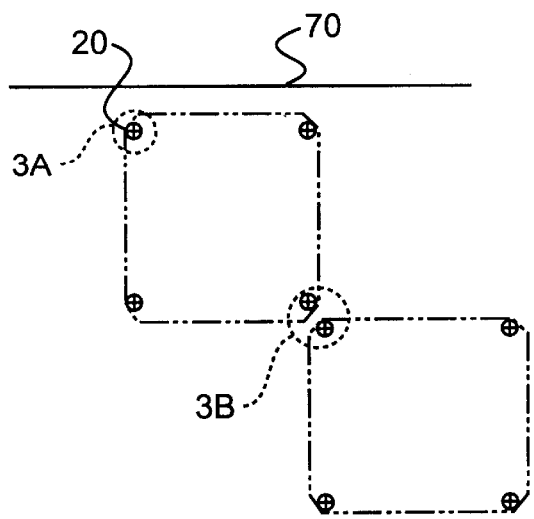
FIG. 1 is a top plan view of platform assemblies incorporating trim assemblies of the first and second embodiments of the present invention.
Figure 1A:
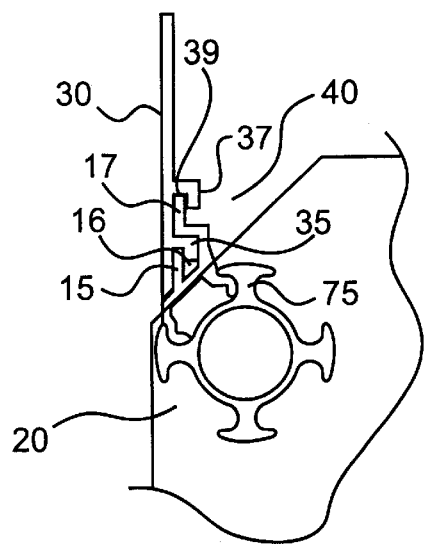
FIG. 1A is a top plan view of a trim assembly in accordance with the second embodiment of the present invention.
Figure 2:
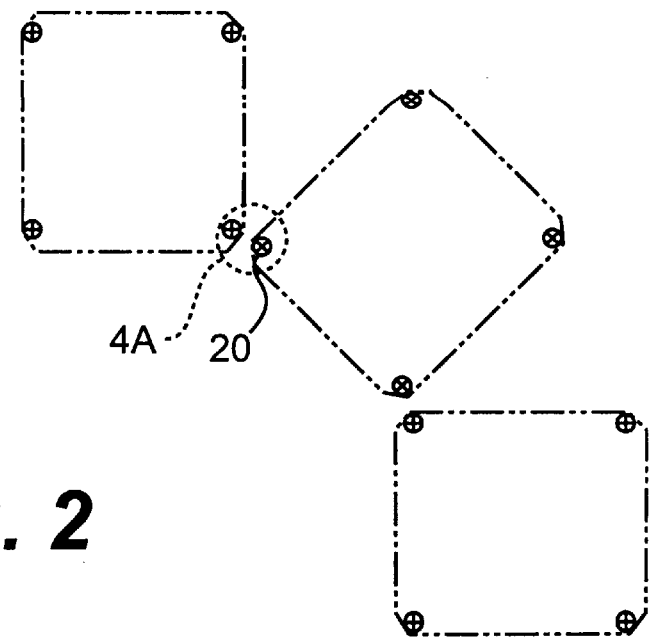
FIG. 2 is a top plan view of platform assemblies incorporating another trim assembly of the first embodiment of the present invention.

The trim assembly of the present invention includes a plurality of interlocking trim members, non-limiting examples of which are individually shown in FIGS. 3–6. Preferably, the trim members are constructed of a rigid plastic material. When assembled, the trim members operate to removably secure flanged support posts 20 at fixed positions or orientations relative to one another, as shown in FIGS. 1 and 2. Alternatively, the trim members can operate to form a straight edge for spacing a flanged support post 20 from a wall 70 or other vertically oriented structure, as shown in FIGS. 1 and 1A.

Generally speaking, the trim assembly is comprised of post trim members that can include, for example, a concave portion for engaging the flanged support post 20 and a slotted portion for engaging other trim members; connecting trim members that have opposing flanged sides, each for engaging other trim members; and straight-edged trim members that have a flanged side for engaging other trim members and a straight edge for butting against a wall or other vertically oriented structure. Combinations of these trim members are assembled to be engagable with at least one flanged support post 20. Depending on the trim members used in any one trim assembly, different layouts for the support posts can be achieved.

Figure 1B:
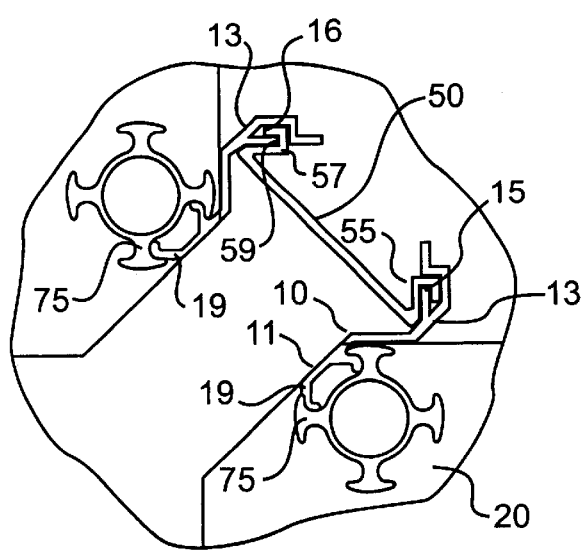
FIG. 1B is a top plan view of a trim assembly in accordance with the first embodiment of the present invention.

In a first embodiment, two post trim members 10 engage opposing sides of one connecting trim member 50 to form a trim assembly for securably connecting two flanged support posts 20, as shown in FIG. 1B.

Figure 3:
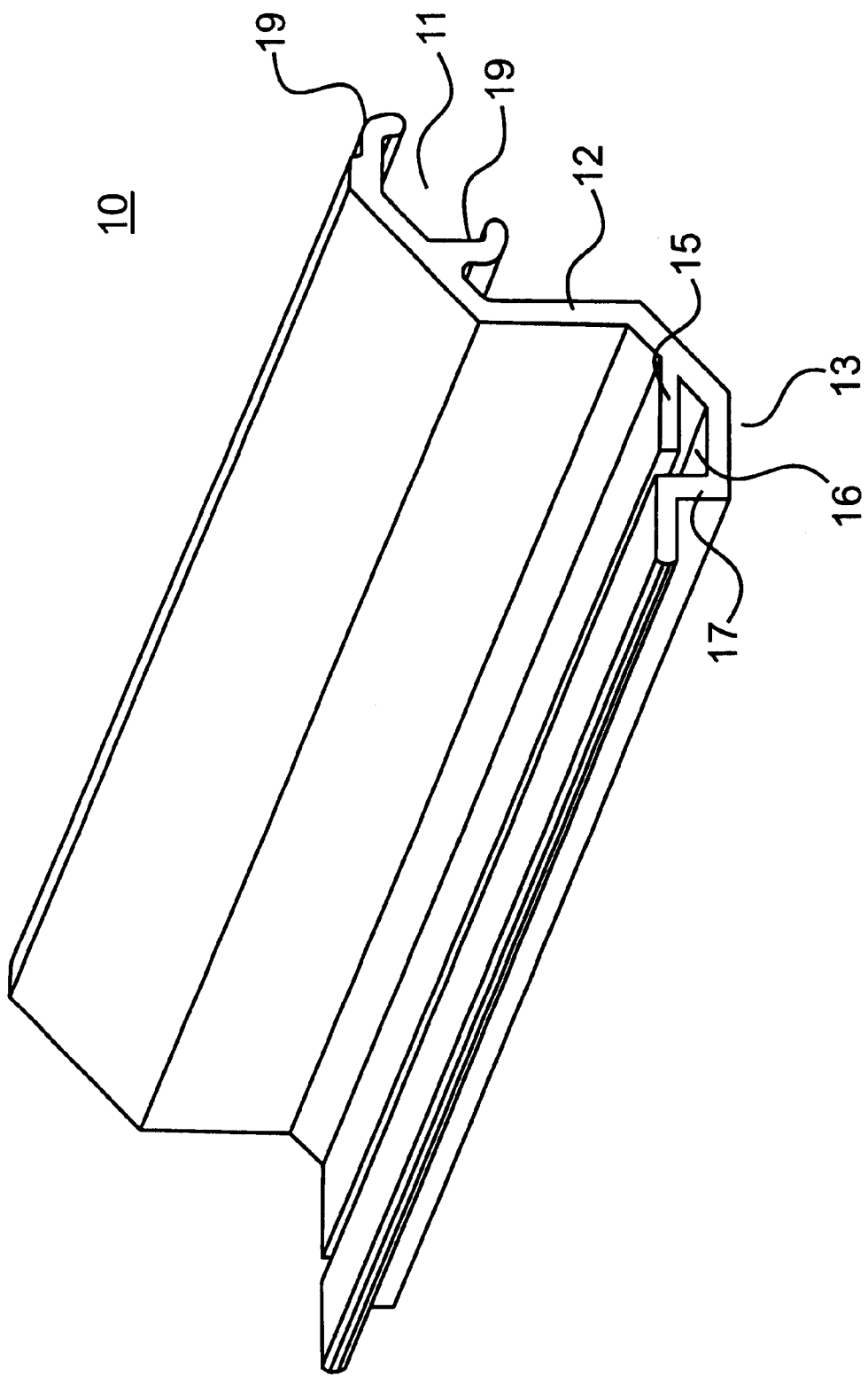
FIG. 3 is a perspective view of a post trim member for use in the first embodiment of the present invention.

FIG. 3 is a perspective view of the type of post trim member 10 used in this embodiment. The post trim member 10 includes a concave portion 11 and a slotted portion 13, at opposite vertical faces thereof.

The concave portion 11, disposed toward a vertical edge of the post trim member 10, is defined by two opposing curved flanges 19 extending outwardly from the post trim member 10 and forming generally C-shaped sides of the concave portion. The concave portion extends longitudinally along the entire vertical length of the post trim member 10. When assembled, the concave portion 11 is engaged by a flanged support post 20, sliding lengthwise into the concave slots defined by adjacent T-shaped flanges 75 extending longitudinally along the flanged support post 20. As shown in FIG. 1B, the curved flanges 19 of the concave portion 11 engage interior sides of the adjacent T-shaped flanges 75 of the flanged support post 20. By this construction, the post trim member 10 is removably secured to the flanged support post 20.

FIG. 3 also shows a slotted portion 13 of the post trim member 10 of this embodiment separated by a spanning portion 12 and disposed toward a vertical edge opposite the concave portion 11. The slotted portion 13 includes a straight flange 15 and a stepped flange 17, each extending diagonally outward from a face of the post trim member 10 opposite that from which the concave portion 11 extends. Both flanges 15, 17 extend longitudinally along the entire vertical length of the post trim member 10 and define a longitudinally oriented slot 16 also extending the entire vertical length of the post trim member 10. When assembled, the slotted portion 13 slidably engages a complimentary slotted portion 55 of a connecting trim member 50, as shown in FIG. 1B.

Figure 6:
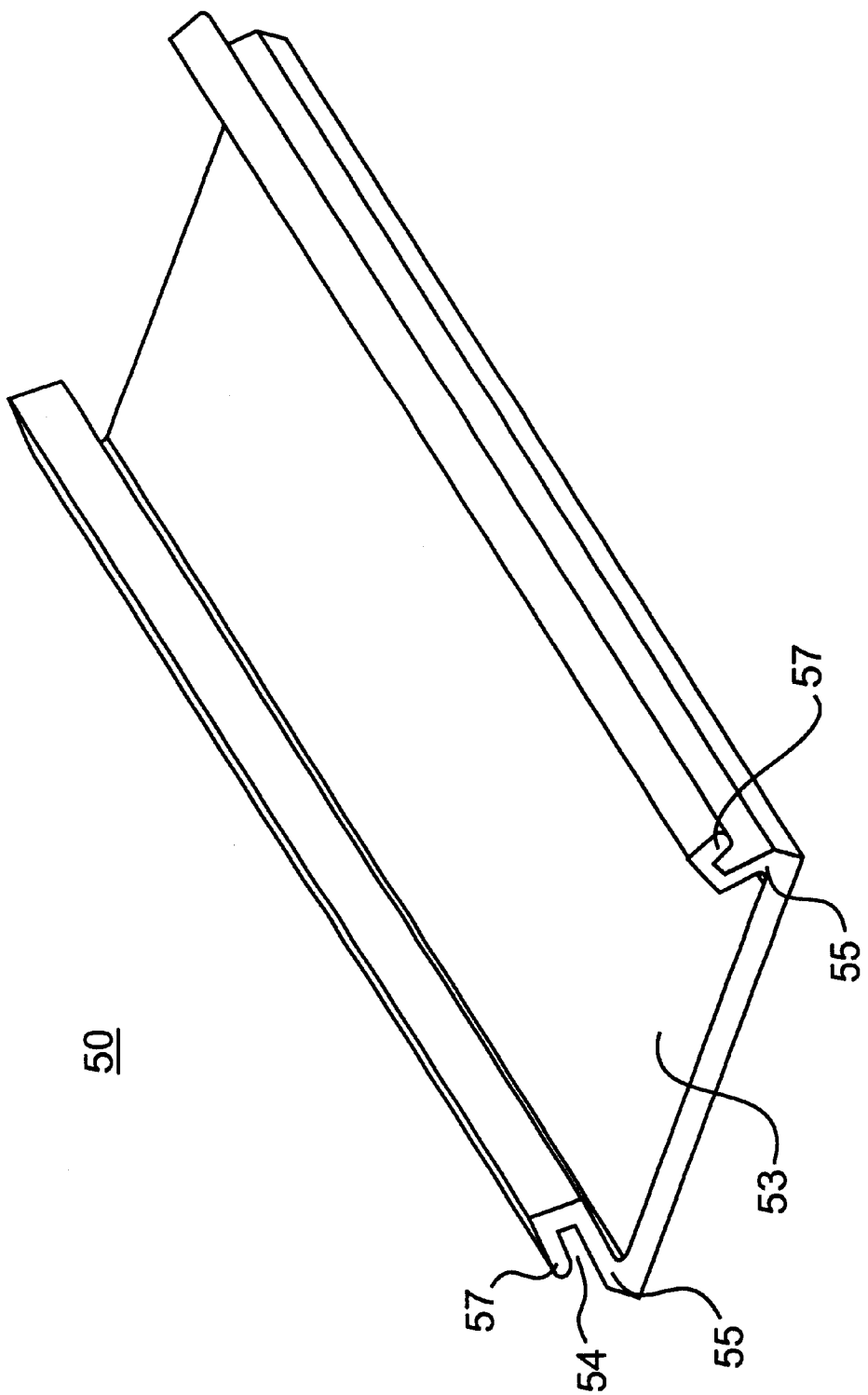
FIG. 6 is a perspective view of a connecting trim member for use in a trim assembly of the first embodiment of the present invention.

FIG. 6 is a perspective view of the connecting trim member 50 used in this embodiment. The connecting trim member 50 includes a longitudinally extending flat, elongated body 53 and two slotted portions 55 extending longitudinally along the entire length of opposing vertical edges of the flat, elongated body 53. Each slotted portion is formed of an inwardly angled L-shaped flange 57 extending along the entire length of the vertical edge that is folded back on itself to define a slot 59, which also extends along the entire length of the side edge.

The structures of the slotted portion 55 of the connecting trim member 50 and the slotted portion 13 of the post trim member 10 compliment one another such that they are slidably engagable along their respective vertical lengths. As shown in FIG. 1B, the flange 57 of the connecting trim member 50 slidably engages the slot 16 of the post trim member 10 and the straight flange 15 of the post trim member 10 slidably engages the slot 59 of the connecting trim member 50.

When assembled, the connecting trim member 50 vertically interlocks with the two post trim members 10, which in turn vertically interlock separate flanged support posts 20. Thus constructed, the trim assembly of this embodiment secures the flanged support posts 20 at fixed orientations and distances relative to one another. Accordingly, the relative orientation and position of the platform assemblies attached to the respective flanged support posts 20 can also be secured. FIG. 1 shows platform assemblies oriented 90° relative to one another using the trim assembly of this embodiment.

Figure 2A:
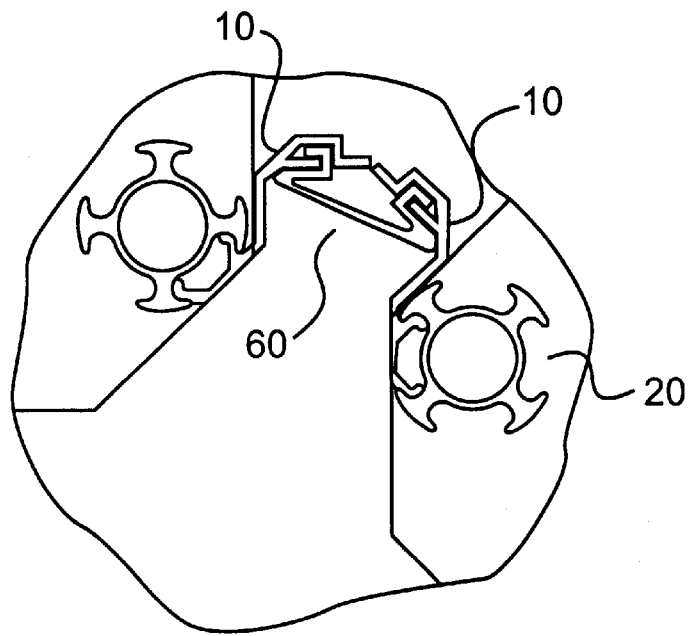
FIG. 2A is a top plan view of a trim assembly in accordance with the first embodiment of the present invention.

However, differently constructed connecting trim members 50 or post trim members 10 can be used to vary the relative positions and orientations of the flanged support members 20. For example, in another construction of this embodiment, shown in FIG. 2A, the post trim members 10, as described above, can be connected with a connecting trim member 60 having an elongated body 53 with differently angled opposing L-shaped flanges 57 than the connecting trim member 50 shown in FIG. 1B. By altering the connecting trim member 50 in this manner, the support posts 20 and respective platform assemblies can be alternatively positioned relative to one another (e.g., 45°), as shown in FIG. 2.

In a second embodiment of the present invention, a trim assembly is formed with one post trim member 40 and a straight-edged trim member 30. In this embodiment, the trim assembly operates as a butting or spacing assembly, attaching to one support post butting against a wall 70 or other vertically oriented structure to evenly space the support post from the wall 70 at all points along its vertical length. FIGS. 1 and 1A show a trim assembly of this embodiment.

Figure 5:
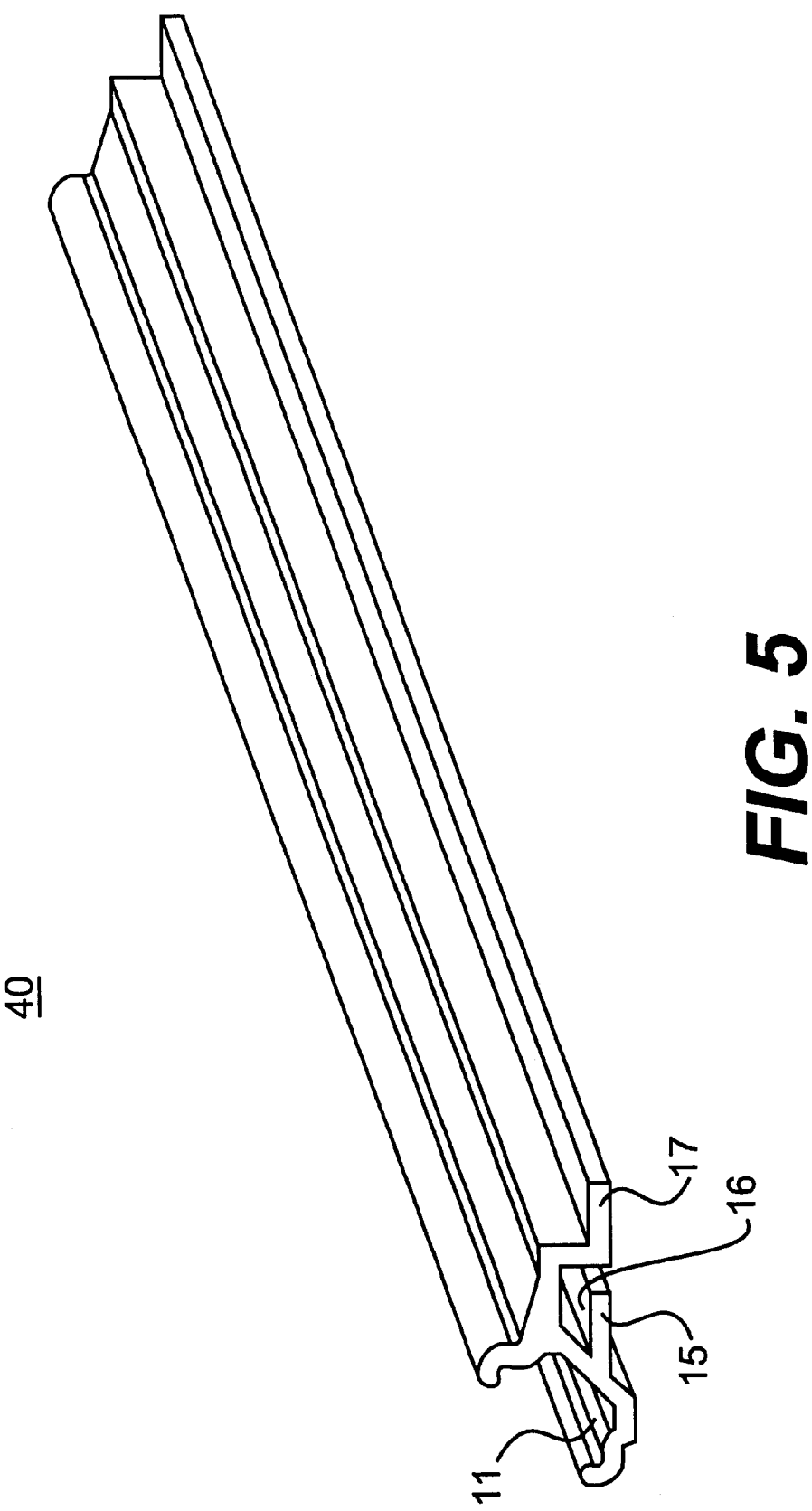
FIG. 5 is a perspective view of a post trim member for use in a trim assembly of the second embodiment of the present invention.

A perspective view of the post trim member 40 of this embodiment is shown in FIG. 5. This post trim member 40 includes a concave portion 11 the same as the concave portion 11 in FIG. 3 and described above with respect to the first embodiment. The concave portion 11 of this post trim member 40 also slidably engages a flanged support post 20, sliding lengthwise into the concave slots defined by the T-shaped flanges 75 extending longitudinally along the flanged support post 20, as shown in FIG. 1A.

Extending outwardly from the exterior side of the concave portion 11 are two flanges, including a straight flange 15 and a stepped flange 17, substantially the same as described above with respect to the first embodiment but without the spanning portion 12. Both flanges are vertically oriented when assembled, and extend longitudinally along the entire vertical length of the post trim member 40. Along with the exterior side of the concave portion 11, the straight flange 15 and stepped flange 17 define a slot 16 that also extends longitudinally along the entire vertical length of the post trim member 40.

Figure 4:
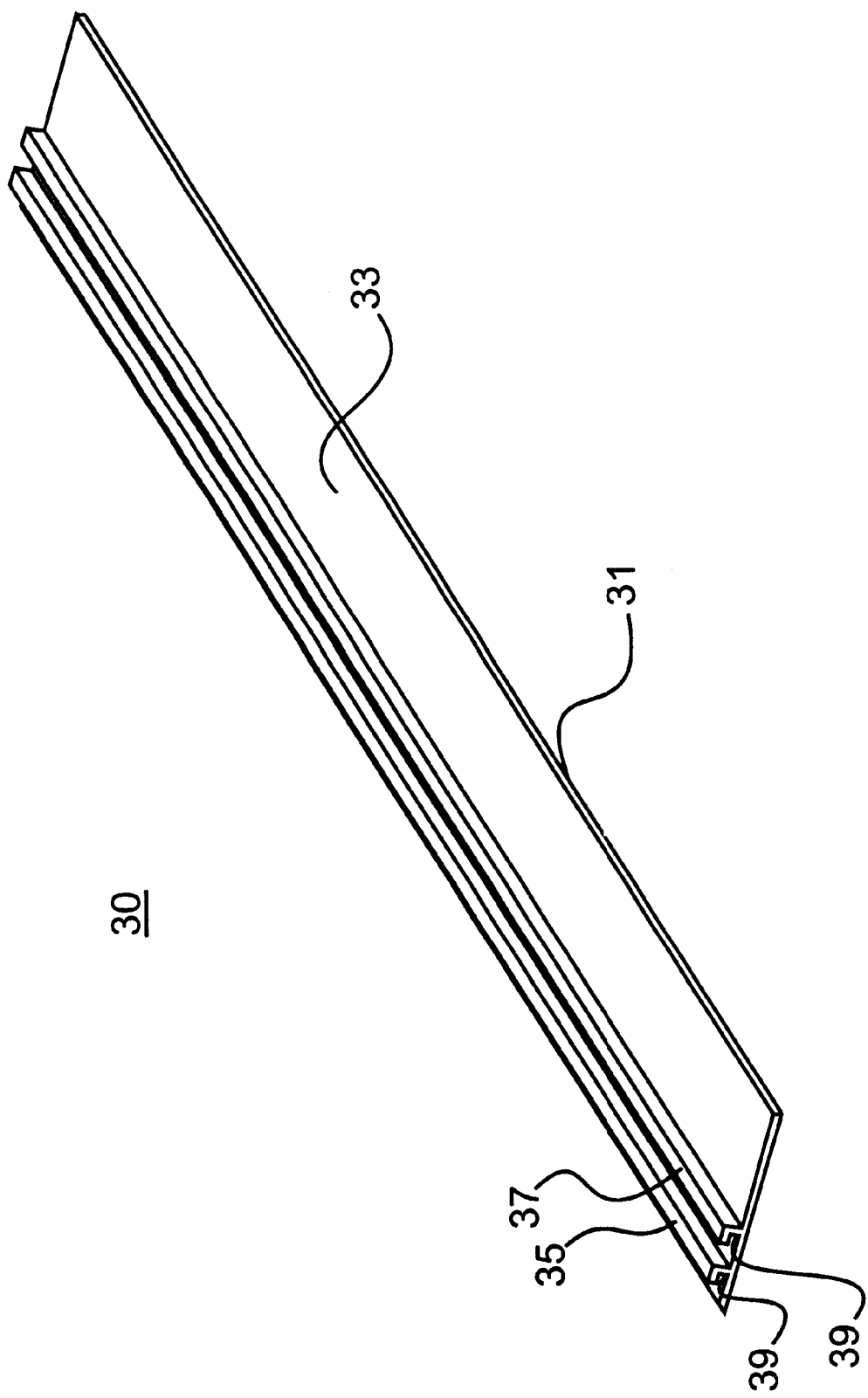
FIG. 4 is a perspective view of a straight-edged trim member for use with a trim assembly of the second embodiment of the present invention.

FIG. 4 is a perspective view of the straight-edged trim member 30 of this embodiment. The straight-edged trim member 30 includes a vertically elongated flat portion 33 with two opposing faces. Two L-shaped flanges 35, 37 extend outward, perpendicularly from the plane of the same face of the elongated flat portion 33 such that an edge flange 35 is closest to the vertical edge of that side of the face and a center flange 37 is closest to the center of the face. The elbows of both L-shaped flanges 35, 37 are oriented such that the ends of both flanges point toward the vertical edge closest to the edge flange 35, the ends being parallel to the plane of the face on which they are positioned. The L-shaped flanges 35, 37 extend longitudinally along the entire vertical length of the straight-edged trim member 30. Each L-shaped flange forms a slot 39 together with the face of the elongated portion 33 on which it is positioned and each slot 39 extends longitudinally along the entire vertical length of the straight-edged trim member 30. On the opposite side of that face is formed a straight edge 31 also extending along the entire vertical length of the straight-edged trim member 30.

The L-shaped flanges 35, 37 and slots 39 of the straight-edged trim member 30 form a complimentary structure to the straight and stepped flanges 15, 17 forming the slot 16 of the post trim member 40 shown in FIG. 5. When assembled, the flanges 15, 17 of the post trim member 40 slidably engage each slot 39 of the straight-edged trim member 30, and the flange 35 of the straight-edged trim member 30 engages the slot 16 of the post trim member 20, as shown in FIG. 1A.

Thus constructed, the trim assembly of this embodiment is removably secured to a flanged support post 20 along the concave portion 11 of the post trim member 40 such that the straight edge 31 is vertically disposed to butt against a wall 70 or other vertically oriented structure, keeping the flanged support post 20 evenly spaced from the wall or other structure along its length, as shown in FIGS. 1 and 1A.

As will be appreciated, the trim assembly of the present invention allows for a modular unit to be oriented with respect to another object, such as another modular unit or a wall. As disclosed, the first and second embodiments are formed of a plurality of interlocking trim members to achieve this object while also allowing for the trim assembly itself to be as modular as possible. However, a one-piece trim assembly could be provided without departing from the scope of the invention.

Although specific embodiments of the present invention have been described above in detail, it will be understood that this description is merely for purposes of illustration. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A trim assembly for use with flanged support posts, comprising:

a first trim member engageable with a first flanged support cost, said first trim member comprising (i) a first engaging member extending vertically alone the length of one side of said first trim member and being engageable with the first flanged support post, and (ii) a second engaging member extending vertically along the length of an opposing side of said first trim member;

a second trim member engageable with said first trim member, said second trim member comprising (i) a first engaging member extending vertically along the length of one side of said second trim member and engaging said second engaging member of said first trim member, and (ii) a second engaging member extending vertically alone the length of an opposing side of said second trim member; and a third trim member engageable with said second trim member and a second flanged support post, said third trim member comprising (i) a first engaging member extending vertically along the length of one side of said third trim member and being engageable with the second flanged support post, and (ii) a second engaging member extending vertically along the length of an opposing side of said third trim member and engaging said second engaging member of said second trim member, wherein said trim members are formed of a rigid material, fixing the flanged support posts at relative positions and orientations when engaged, and wherein said first engaging members of said first and third trim members each comprises two opposing curved flanges extending outwardly from said trim member to form a concave portion, said curved flanges slidably engaging adjacent flanges of respective flanged support posts; said first and second engaging members of said second trim member each comprises a folded flange extending along the vertical length thereof, said folded flange defining a slot; and said second engaging members of said first and third trim members each comprises two parallel flanges extending along the vertical length thereof, said flanges defining a slot.

2. A trim assembly according to claim 1, wherein one flange of each of said second engaging members of said first and third trim members slidably engage separate slots of said second trim member, and said folded flanges of said second trim member each engage slots of said first and third trim members.

3. A trim assembly for use with flanged support posts, comprising:

a first trim member engageable with a first flanged support post, said first trim member comprising (i) a first engaging member extending vertically along the length of one side of said first trim member and being engageable with the first flanged support post, and (ii) a second engaging member extending vertically along the length of an opposing side of said first trim member; and a second trim member engageable with said first trim member, said second trim member comprising (i) an engaging-member extending vertically along the length of one side of said second trim member and engaging said second engaging member of said first trim member, and ii) a straight edge extending vertically alone the length of an opposing side of said second trim member, wherein said first engaging member of said first trim member comprises two opposing curved flanges extending outwardly from said trim member to form a concave portion, said curved flanges slidably engaging adjacent flanges of the flanged support post, and said second engaging member of said first trim member comprises two parallel flanges extending along the vertical length thereof, said flanges defining a slot.

4. A trim assembly according to claim 3, wherein said engaging member of said second trim member comprises:

two folded flanges extending along the vertical length thereof, each said folded flange defining a slot.

5. A trim assembly according to claim 4, wherein said parallel flanges of said second engaging member of said first trim member slidably engage the slots of said second trim member, and one said folded flange of said second trim member engages the slot of said first trim member.

* * * * *